(12) United States Patent
McKenna et al.

(10) Patent No.: US 12,384,431 B2
(45) Date of Patent: Aug. 12, 2025

(54) SYSTEMS AND METHODS FOR TRAIN TRACKING

(71) Applicant: Siemens Mobility, Inc., New York, NY (US)

(72) Inventors: Monica McKenna, North Berwick, ME (US); Remo Ferrari, East Brunswick, NJ (US)

(73) Assignee: Siemens Mobility, Inc., New York, NY (US)

( * ) Notice: Subject to any disclaimer, the term of this patent is extended or adjusted under 35 U.S.C. 154(b) by 117 days.

(21) Appl. No.: 18/475,692

(22) Filed: Sep. 27, 2023

(65) Prior Publication Data

US 2025/0100597 A1 Mar. 27, 2025

(51) Int. Cl.
*B61L 15/00* (2006.01)
*B61L 25/02* (2006.01)

(52) U.S. Cl.
CPC ....... *B61L 15/0018* (2013.01); *B61L 15/0072* (2013.01); *B61L 25/025* (2013.01); *B61L 2205/04* (2013.01)

(58) Field of Classification Search
CPC ............. B61L 15/0018; B61L 15/0072; B61L 25/025; B61L 2205/04
USPC ....................................... 701/19, 20
See application file for complete search history.

(56) References Cited

U.S. PATENT DOCUMENTS

2017/0158213 A1* 6/2017 Mathews ................ B60T 7/126

FOREIGN PATENT DOCUMENTS

EP 3925853 A1 12/2021

* cited by examiner

*Primary Examiner* — Hai H Huynh

(57) ABSTRACT

A train tracking system includes a train tracking module, a plurality of input sources providing train related information, and one or more interface(s) associated with the train tracking module, wherein the train tracking module is configured via computer executable instructions and through operation of a processor to receive the train related information from the plurality of input sources via the one or more interface(s), determine a position of a train within a train track map, and determine a location attribute for the position of the train.

17 Claims, 4 Drawing Sheets

SYSTEMS AND METHODS FOR TRAIN TRACKING

BACKGROUND

1. Field

Aspects of the present disclosure generally relate to the field of railway technology, such as guiding and ensuring safety of railway traffic. More specifically, aspects relate to train tracking within dispatch systems via multiple methods in connection with railway vehicles, e.g., trains, such as freight trains.

2. Description of the Related Art

Controlling movement of trains in a modern environment is a complex process. Collisions with other trains must be avoided and regulations in areas such as grade crossings must be complied with.

In an example of freight trains, freight train routes are planned, but allowing a given train to travel a planned route and specifics of exactly which track the trains are on is controlled by dispatchers. Dispatchers use a 'Dispatch System' to control switches and signals to clear the routes for the trains, as well as issuing authorities for areas of track that are not controlled by signals. For the purposes of overseeing and controlling this routing, the dispatchers need to be aware of where the freight trains are. Symbols for the trains in route are shown on a display in the dispatch system to indicate the trains' locations. This is called train tracking.

Accurate knowledge of where the trains are allows for safer and more efficient train operations. In North American for example, there is limited in-track detection devices for knowing the exact location of the train. Thus, there may be a need for improved train tracking.

SUMMARY

Briefly described, one or more embodiments of the present disclosure provide for systems and methods for train tracking, for example in connection with a dispatch system.

A first aspect of the present disclosure provides a train tracking system comprising train tracking module, a plurality of input sources providing train related information, and one or more interface(s) associated with the train tracking module, wherein the train tracking module is configured via computer executable instructions and through operation of at least one processor to receive the train related information from the plurality of input sources via the one or more interface(s), determine a position of a train within a train track map, and determine a location attribute for the position of the train.

A second aspect of the present disclosure provides a method for train tracking, the method comprising through operation of at least one processor collecting train related information from a plurality of input sources via one or more interface(s), determining a position of a train within a train track map based on the train related information, and determining a location attribute for the position of the train.

A third aspect of the of the present disclosure provides a non-transitory computer readable medium encoded with processor executable instructions that when executed by at least one processor, cause the at least one processor to carry out a method for train tracking as described herein.

DETAILED DESCRIPTION

Figure 1:
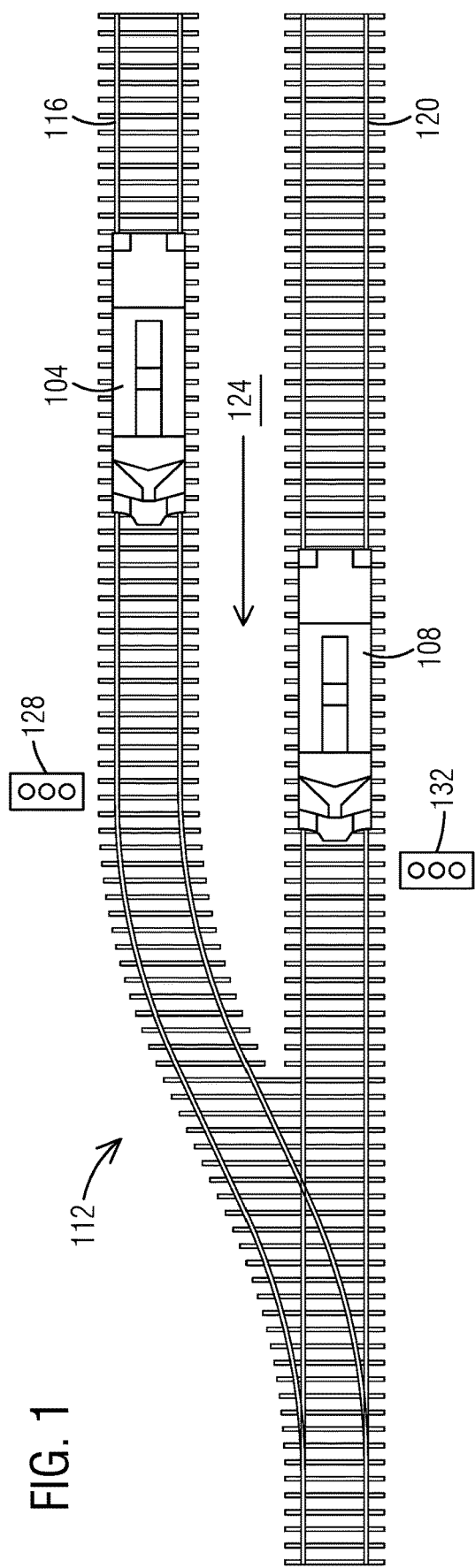
FIG. 1 illustrates a schematic of train tracking in accordance with an exemplary embodiment of the present disclosure.

To facilitate an understanding of embodiments, principles, and features of the present disclosure, they are explained hereinafter with reference to implementation in illustrative embodiments. In particular, they are described in the context of systems and methods for train tracking.

Various technologies that pertain to systems and methods will now be described with reference to the drawings, where like reference numerals represent like elements throughout. The drawings discussed below, and the various embodiments used to describe the principles of the present disclosure in this disclosure are by way of illustration only and should not be construed in any way to limit the scope of the disclosure.

FIG. 1 illustrates a schematic of train tracking in accordance with an exemplary embodiment of the present disclosure.

The following embodiments and examples are described in connection with freight trains. However, it should be noted that the described systems and methods may be applicable to other types of railway vehicles, such as passenger trains. Examples of trains include streetcars, light rail vehicles, automatic (airport) shuttles, metros, commuter trains, EMU (Electric Multiple Units), DMUs (Diesel Multiple Units), and high-speed trains etc.

With reference to FIG. 1, freight trains 104 and 108 travel within a train network, wherein only a section 112 of the train network is shown. The train network section 112 is a small part of a much larger train network comprising many train tracks and railway components. The train 104 travels on track 116 and train 108 travels on track 120. In this example, both trains 104 and 108 travel in the same direction, as shown by indicator 124. The train network is displayed on a screen or display as a track map. The screen/display is coupled to a dispatch system. The dispatch system will be described in more detail in connection with FIG. 2 and FIG. 3. In short, dispatch systems are used for train tracking, more specifically for overseeing and controlling routing of the trains 104, 108. Thus, symbols for the trains 104, 108 in route are shown on the display in the dispatch system to indicate the trains' locations.

Further, railway signals 128 and 132 are illustrated and displayed. The railroad industry employs wayside signals to inform train operators, and wayside maintainers, of various types of operational parameters. For example, colored wayside signal lights, such as signals 128 and 132, are often used to inform a train operator as to whether and how a train may enter a block of track associated with the wayside signal light. The status (color) of wayside signal lamps is sometimes referred to in the art as the signal aspect. One simple example is a three-color system known in the industry as Automatic Block Signaling (ABS), in which a red signal indicates that the block associated with the signal is occupied, a yellow signal indicates that the block associated with the signal is not occupied but the next block is occupied, and green indicates that both the block associated with the signal and the next block are unoccupied.

Figure 2:
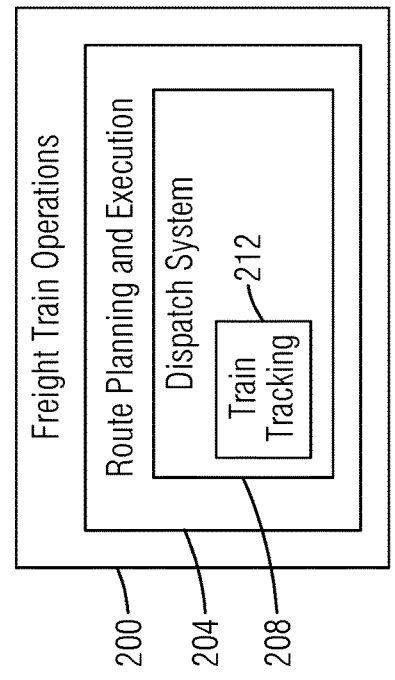
FIG. 2 illustrates a schematic of train operations in accordance with an exemplary embodiment of the present disclosure.

FIG. 2 illustrates a schematic of train operations in accordance with an exemplary embodiment of the present disclosure.

In general, freight train operations 200 require route planning and execution 204. Dispatch systems, such as dispatch system 208, are part of the route planning and execution. Train tracking 212, i.e., knowing where the trains are, is a key part of the dispatch system 208. Train operations 200 including route planning and execution 204, dispatch system 208 and train tracking 212 include manual and automated steps and processes. Train tracking 212 includes a train tracking module 220 which is described in more detail in the following.

The dispatch system 208 is a computer aided dispatch system, herein also referred to as CAD system 208. Typically, the CAD system 208 is operably coupled to a back-office server system (not illustrated), herein also referred to as BOS system, which is a storehouse for speed restrictions, track geometry and wayside signaling configuration databases. The CAD system 208 can be integrated in the BOS system. The CAD system 208 is configured to display and dispatch information, data and messages to other components or sub-systems, such as the BOS system. The CAD system 208 comprises a human-machine-interface (HMI), e.g., computer and screen/display, and can be configured to display information on the screen, such as information/data collected by different components or equipment, for example on-board units of trains, wayside interface units, etc. Further, the CAD system 208 is configured such that information/data or commands can be entered manually by an operator, for further processing by the CAD system 208 and/or the BOS system.

Figure 3:
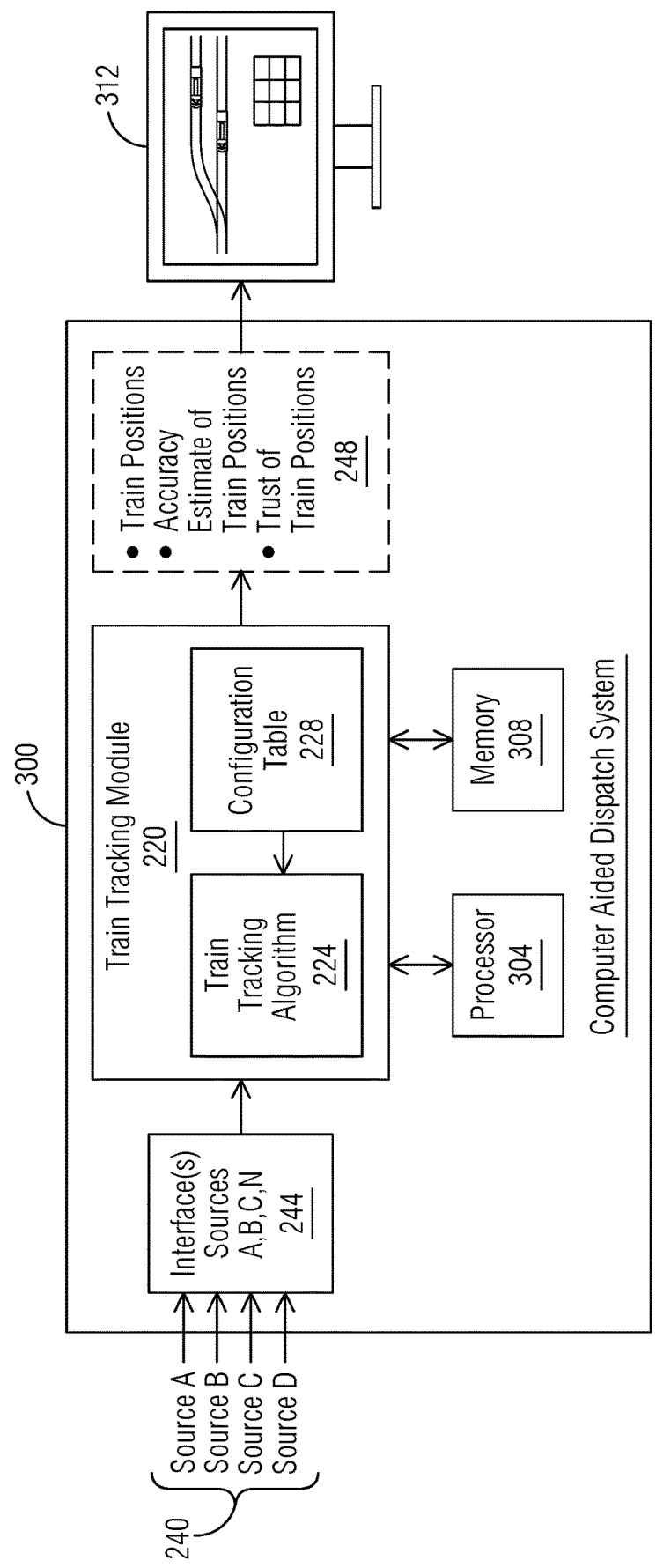
FIG. 3 illustrates a schematic of a train tracking module in accordance with an exemplary embodiment of the present disclosure.

FIG. 3 illustrates a schematic of a train tracking module in accordance with an exemplary embodiment of the present disclosure.

Train tracking today in North America for freight trains often uses track circuit indicators and form-based authorities. Track circuit indicators only indicate within track segments where the train is located, as the track circuit is 'tripped' as the train wheels drive over the circuit. Track circuits can vary in length, typically from 2500 feet to 10,000 feet. The indication just indicates that a train has tripped the circuit in the track circuit block, not specifically where in the track circuit block the train is located. Tripping a track circuit does not provide any information about which train tripped the circuit, so current dispatch systems must rely on assumptions about the progression of track circuits along a route, which can at times be misleading.

When there are no track circuits, freight trains use form-based authorities to have permission to be on a specific track location. The length of the form-based authority can vary in size up to several miles. Form-based authorities in most systems rely on the train crews reporting their location to dispatchers for the release of authorities, roll-up (shortening) of authorities, and requesting new authorities. Train crews often use visual inspection for indication of their location (such as milepost signs along the track). When a form-based authority is active for a train, it only indicates that the train is within the bounds of that authority.

Therefore, with current systems, it is difficult to know exactly where the train is. Also, if the track circuit is defective or a form-based authority is incorrect for any reason, the only backup information is verbal communication between the train crew and dispatcher. Some systems in development may use global positioning system (GPS) messaging to track trains.

As previously noted, accurate knowledge of where the trains are allows for safer and more efficient train operations. Thus, systems and methods are provided for improved train tracking. More specifically, provided herewith are a configurable system and a configurable method to accurately place trains on a train track map (determination of a location or position of a train), and further introduces a concept of 'trust' in a train's location.

The configurable system comprises a train tracking module 220, a plurality of input sources 240 providing train related information and one or more interface(s) 244 coupled to the train tracking module 220 for receiving the information of the input sources 240.

In an exemplary embodiment of the present disclosure, the train tracking module 220 is configured to execute train tracking, illustrated by train tracking algorithm 224, utilizing at least one processor 304 and memory 306. The train tracking module 220 is configured via computer executable instructions and through operation of the processor 304 to receive the train related information from the plurality of input sources 240 via the one or more interface(s) 244, determine a position of a train within a train track network (train map), estimate an accuracy of the position of the train, and determine a location attribute for the position of the train, as by output 248.

The train tracking module 220 is configured to perform calculation(s), determination(s) and estimates 248, based on the multiple input sources 240, e.g. source A, source B, source C, source N. It should be noted that there may be more input sources 240. The module 220 is configured to use input sources 240 depending on for example availability and/or usefulness. The module 220 may only utilize two sources 240 or may utilize twenty sources 240 for performing the algorithm 224. The input sources 240 may include for example input from one or more trains, e.g., locomotive with GPS of the trains, input from wayside crossing equipment, e.g., a track circuit etc. Other types of input sources 240 are described in more detail with reference to FIG. 4.

The one or more interface(s) 244 are generally configured to provide, for example to collect, obtain or receive, data from the sources A, B, C and N. An example for an interface is a computing interface or software implemented interface which defines interactions between multiple software intermediaries. An example for a computing interface is an application programming interface (API), wherein the API interacts with separate software components or resources for providing, e.g., transferring or exchanging, data in an automated manner from the data sources 240 to the target application (module 220).

Further, a configuration table 228 is provided and configured to be accessed by the train tracking module 220 and utilized in the algorithm 224, wherein the location attribute ('trusted' or 'suspect') of the position of the train is determined based on the configuration table 228. The location attribute includes 'trusted' and 'suspect', e.g., a trusted position and a suspect position.

Further, the train tracking module 220 is configured to provide accuracy estimates of the train positions. Such accuracy estimates may be expressed by percentage or other type of label, level, or degree. For example, a calculated or determined train position may have a 70% accuracy estimate associated with it, which means that the train position is mostly correct and can be trusted. A definition when or at what accuracy estimate percentage a train position can be trusted, is (manually) configurable for example by the dispatcher. The element 'dispatcher' as used herein is an admin/administrator of the dispatch system 300. The configuration table 228, level of trust and accuracy estimate will be described in more detail in connection with FIG. 5.

The train tracking module 220 can be an individual system and operably coupled to the computer aided dispatch system 300, or the train tracking module 220 can be integrated or implemented by the CAD system 300, as illustrated in FIG. 3. The processor 304 and memory 308 are part of the dispatch system 300. The train tracking module 220 may be embodied as software or a combination of software and hardware. In our example, the train tracking module 220 may be incorporated, for example programmed, into the CAD system 300.

The dispatch system 300 comprises or is coupled to a display 312, wherein the output 248 of the train tracking module 220 is displayed via the display 312 to a dispatcher or operator. The output 248 can be shown as data or messages, and within/part of track maps. The calculated positions of trains are integrated and shown via the track map.

Figure 4:
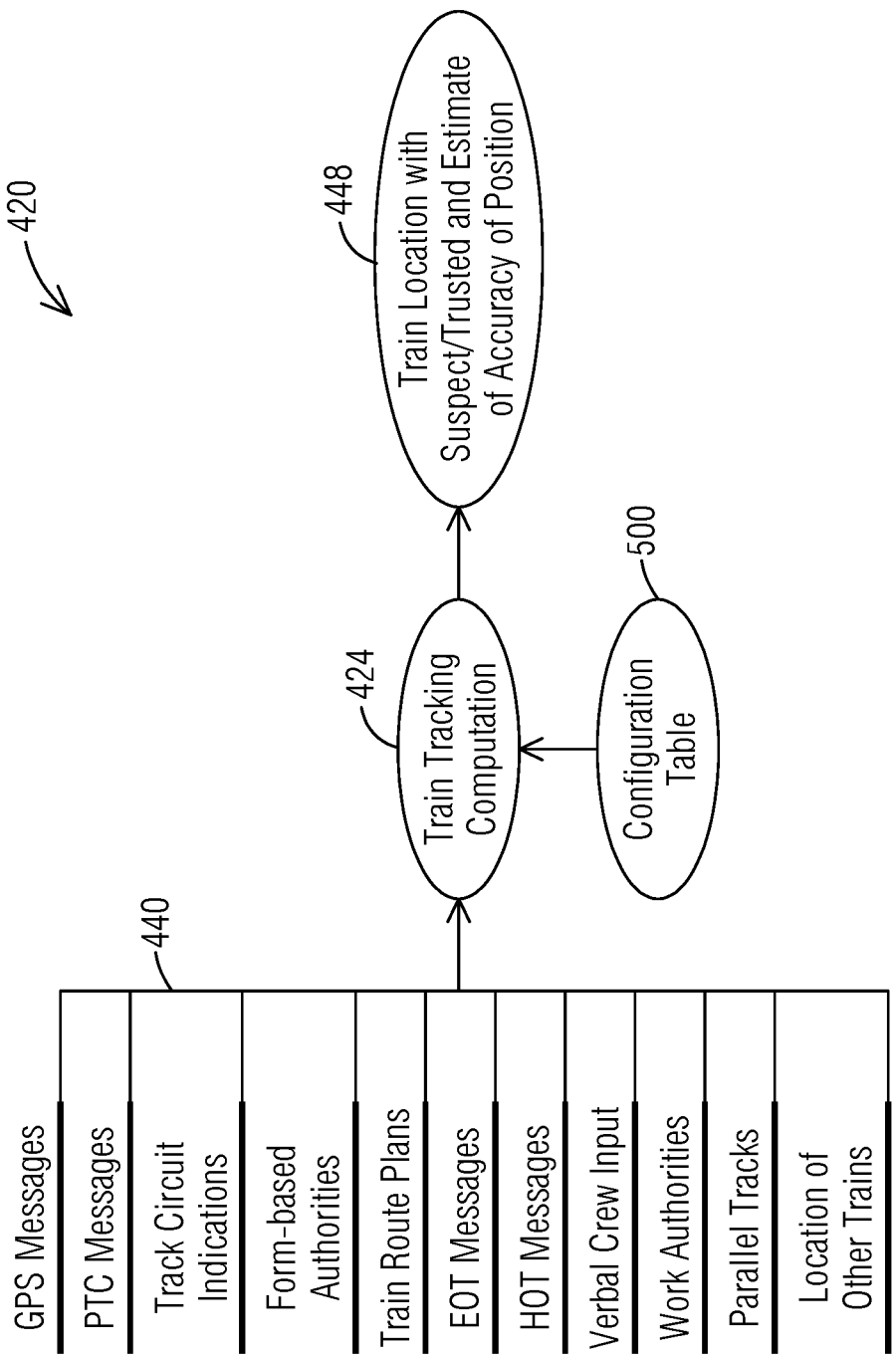
FIG. 4 illustrates a schematic of an embodiment a train tracking module including various input sources in accordance with an exemplary embodiment of the present disclosure.

FIG. 4 illustrates a schematic of an embodiment a train tracking module including various input sources in accordance with an exemplary embodiment of the present disclosure.

Figure 5:
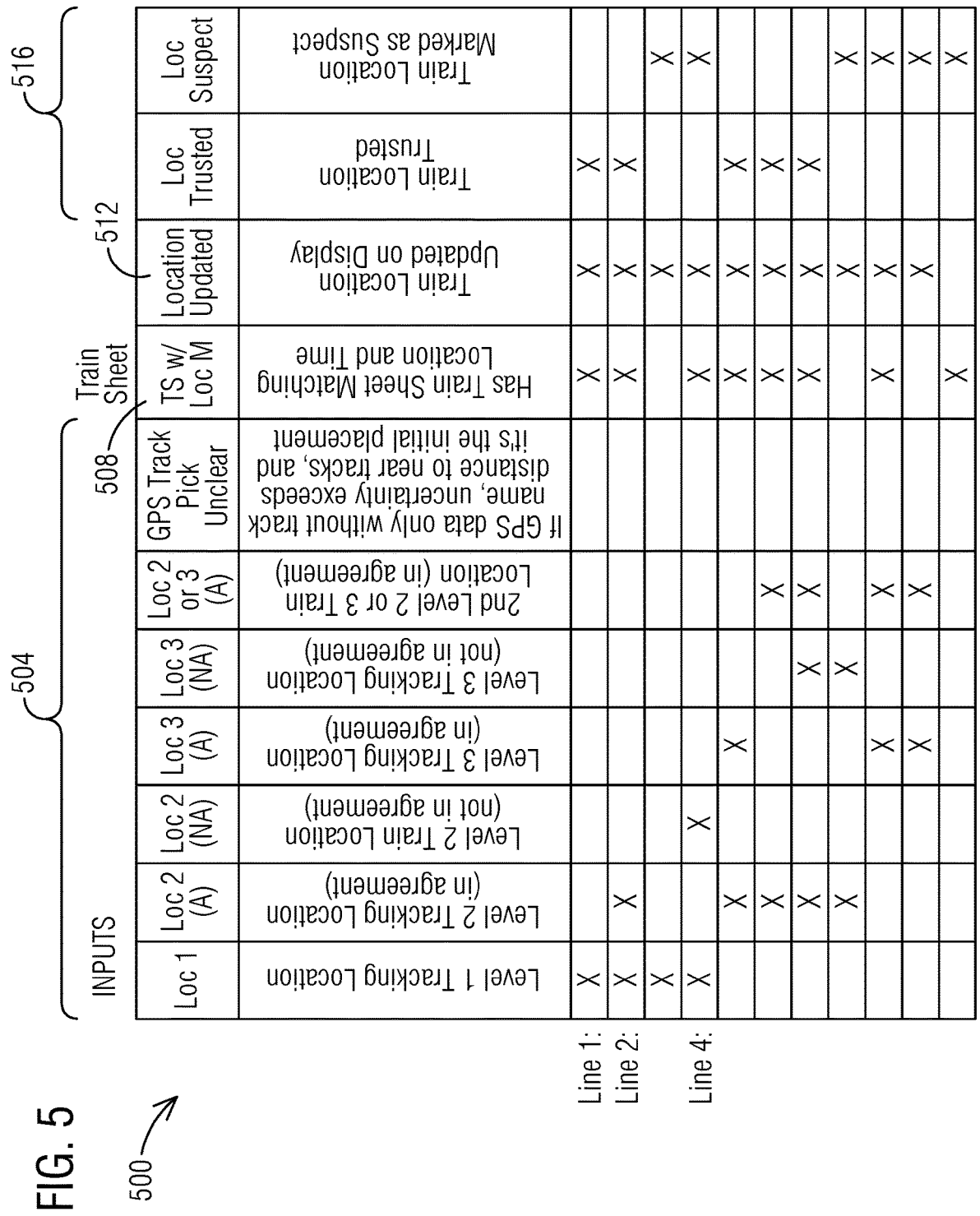
FIG. 5 illustrates a configuration table in connection with a train tracking module in accordance with an exemplary embodiment of the present disclosure.

Train tracking module 220 of FIG. 3 illustrates a generic module, whereas train tracking module 420 of FIG. 4, in connection with configuration table 428 of FIG. 5, is based on the generic module but comprises concrete features, such as concrete input sources 440.

In accordance with an exemplary embodiment of the present disclosure, an objective is to use all available sources of information (input sources 440) for a specific application or use case. In our example, the input sources 440 include train planned routes, if there are tracks parallel to the train location and their distance apart, PTC (positive train control) location messaging include GPS accuracy, additional GPS (global positioning system) messages from the train with accuracy when available, EOT (end of train device) and HOT (head of train device) inputs, verbal information from a train crew, authorities for the train, locations of other trains, work authorities for track locations. All input sources 440 are combined via the train tracking module 420 and train tracking algorithm 424 to (most) accurately place the trains on the track map, see output 448. Again, it should be noted that the list of input sources 440 can vary for each application or system, depending for example on how many and which types of input sources 440 are available, and/or on the type of dispatch system 300 being able to process the input sources 440.

As noted earlier, the train tracking module 420 is configured to receive and process all input information and data from sources 440, and calculate and/or determine various outputs 448, such as train locations with suspect location or trusted location (location attribute) and an estimate of an accuracy of the train locations. The concept of suspect versus trusted locations comprises a calculation using the available input sources 440 to determine if the location shown for the train is trusted and at what accuracy. This may affect the decisions made by the dispatcher and/or the dispatch system 300 and improve safety and efficiency.

FIG. 5 illustrates a configuration table in connection with a train tracking module, as illustrated for example in FIG. 3 and FIG. 4, in accordance with an exemplary embodiment of the present disclosure.

FIG. 5 illustrates an example of a configuration table 500. It should be noted that the configuration table 500 may look different for different scenarios, applications or use cases, wherein inputs 504, 508 and outputs, conclusions 516 are individually configurable. In our example, the configuration table 500 comprises multiple inputs 504, 508 and outputs/conclusions 516. The outputs/conclusions 516 include the location attributes 'trusted location' (Loc Trusted) and 'suspect location' (Loc Suspect). 'Trusted location' means that the determined position of a specific train within the train network (train map) is trustworthy and can be treated as correct. 'Suspect location' means that a position of a train cannot be trusted and is likely incorrect or at least uncertain and needs further investigation.

The inputs 504 are based on the plurality of input sources 440 (see FIG. 4), e.g., GPS messages, PTC messages, track circuit indications, etc. The inputs 504 are labelled as Loc 1 (location 1), Loc 2, Loc 3, etc., wherein each location is assigned a specific trust level. Location 1 (Loc 1) comprises level 1 tracking location with a highest level of trust (most reliable and most correct source of position information, based for example on historic knowledge). The levels can be chosen or categorized depending on reliability and accuracy. For example, GPS messages from high precision GPS systems may be given a trust level of 1. Verbal crew input may be given a trust level of 2 or 3. Depending on availability and reliability of the input sources 440, the inputs 504 with trust level are configurable and can be manually changed, for example by the dispatcher.

The example of the configuration table 500 comprises the following inputs 504 with trust level:
  Loc 1—Level 1 Tracking Location
  Loc 2 (A)—Level 2 Tracking Location (in agreement)
  Loc 2 (NA)—Level 2 Tracking Location (not in agreement)
  Loc 3 (A)—Level 3 Tracking Location (in agreement)
  Loc 3 (NA)—Level 3 Tracking Location (not in agreement)
  Loc 2 or 3 (A)—$2^{nd}$ Level 2 or 3 Tracking Location (in agreement)
  GPS Track Pick Unclear—If GPS data without track name, uncertainty exceeds distance to near tracks, and it's the initial placement.

Another input to the calculation/algorithm 424 of the train tracking module 420 is information from a train sheet 508 (TS w/Loc M). The train sheet comprises the movement of trains and includes information where a train should be at what time, similar to a schedule. With respect to the train sheet information 508, the algorithm/method 424 determines whether an obtained position information, for example Loc 1 and/or Loc 2 matches the location and time in the train sheet 508 of the respective train.

Outputs 516 are based on combinations of the trust levels, with a column for an output if the location is to be trusted (Loc Trusted). For example, if there is a trust level 2 input and a trust level 3 location input that agrees, that location is then trusted. If there is a trust level 1 and a trust level 2 input that have different locations (not in agreement), that location is then suspect (Loc Suspect). For example, with respect to line 1 of the table 500, it is defined that when Loc 1 (provided for example by PTC messages) is available and matches the information of the train sheet 508, then the location of train can be trusted, see check mark X for Loc Trusted. In contrast, with respect to line 4, Loc 1 (provided for example by PTC messages) is available, but Loc 2 (provided for example by track circuit indications) is not in agreement, i.e., provides a different location, then the location is considered as suspect and not trustworthy, see check mark X for Loc Suspect. As noted, the inputs, outputs and conclusions are (manually) configurable. For example, in a different scenario, an outcome/conclusion 516 of line 4 may be Loc Trusted (and not Loc Suspect), because the input 504, 508 of line 4 is defined such that the determined position of the train can be trusted.

Further, the outputs 516 can be associated and/or based on accuracy estimates of the determined train positions. As previously noted, such accuracy estimates may be expressed by percentage or other type of label, for example levels 1, 2, etc. In the example where GPS messages from high precision GPS systems are given a trust level of 1, this assigned trust level of 1 may also indicate a high accuracy of the position which corresponds to a high accuracy estimate. Inputs with trust level of 2 or 3 correspond to lower accuracy estimates, wherein a combination of the different inputs with different accuracy estimates lead to a combined accuracy estimate. For example, with respect to line 2 of table 500, a Level 1 input (Loc 1) combined with a Level 2 input in agreement (Loc 2 A) has an output 516 that it is a trusted location (Loc Trusted) and may have a combined accuracy estimate of 1.5 (may correspond to 90%, based on a 100% accuracy of Loc 1 and an 80% accuracy of Loc 2).

The configuration table 500 further comprises information 512 which indicates whether the train location is to be updated in the track map shown on the display 312 of the dispatch system 300. This information is also individually configurable.

Summarizing, the described system and method allow use of multiple sources of information for determining the train's position with a high degree of accuracy, the combining and comparing of those sources to determine if the resulting position can be trusted as well as associating an accuracy estimate of the location. An additional key difference is that there is some configuration ability that allows tuning of the algorithms without having to release a new software version.

It should be appreciated that acts associated with the above-described methodologies, features, and functions (other than any described manual acts) may be carried out by one or more data processing systems, such as for example train tracking module 220, 420, via operation of at least one processor 224. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the module 220 and/or processor 224 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the module 220/processor 224 with the executable instructions (e.g., software/firmware apps) loaded/installed into a memory (volatile and/or non-volatile), which are currently being executed and/or are available to be executed by the processor 224 to cause the processor 224 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein. Further, it should be understood, that reference to "a processor" may include multiple physical processors or cores that are configured to carry out the functions described herein.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C #, C++, Scala, R, MATLAB, Clojure, Lua, Go or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A train tracking system comprising:
   train tracking module,
   a plurality of input sources providing train related information,
   a configuration table configured to be accessed by the train tracking module, and
   one or more interface(s) associated with the train tracking module,
   wherein the train tracking module is configured via computer executable instructions and through operation of at least one processor to
      receive the train related information from the plurality of input sources via the one or more interface(s),
      determine a position of a train within a train track map, and
      determine location attribute for the position of the train,
   wherein the location attribute for the position of the train includes a trusted position and a suspect position,
   wherein the trusted position and the suspect position is determined utilizing the configuration table, and
   wherein a determined position of the train is associated either with the trusted position or the suspect position.

2. The train tracking system of claim 1,
wherein the plurality of input sources comprises global positioning system (GPS) messages, positive train control (PTC) messages, track circuit indications, form-based authorities, train route plans, end of train (EOT) messages, head of train (HOT) messages, verbal crew input, work authorities, parallel tracks, and/or locations of other trains.

3. The train tracking system of claim 1,
wherein the configuration table comprises multiple inputs, the multiple inputs relating to the plurality of input sources, wherein each input comprises an assigned level of trust.

4. The train tracking system of claim 3,
wherein the level of trust includes multiple levels of trust, including a highest level of trust and a lowest level of trust.

5. The train tracking system of claim 4,
wherein the trusted position and the suspect position are based on different combinations of the levels of trust of the multiple inputs.

6. The train tracking system of claim 3,
wherein the train tracking module is further configured to estimate an accuracy of the position of the train based on the levels of trust.

7. The train tracking system of claim 1,
wherein the configuration table including the multiple inputs and assigned levels of trust are individually configurable.

8. The train tracking system of claim 1, further comprising:
a dispatch system,
wherein the train tracking module is operably coupled to the dispatch system, or
wherein the train tracking module is implemented by the dispatch system.

9. The train tracking system of claim 1, further comprising:
a display coupled to the train tracking module,
wherein the train tracking module is further configured to output determinations and calculations with respect to the position of the train and the location attribute for the position of the train on the display.

10. A method for train tracking, the method comprising through operation of at least one processor:
collecting train related information from a plurality of input sources via one or more interface(s),
determining a position of a train within a train track map based on the train related information,
accessing a configuration table, and
determining a location attribute for the position of the train,
wherein the location attribute including a trusted position and a suspect position is determined utilizing the configuration table.

11. The method of claim 10,
wherein the plurality of input sources comprises global positioning system (GPS) messages, positive train control (PTC) messages, track circuit indications, form-based authorities, train route plans, end of train (EOT) messages, head of train (HOT) messages, verbal crew input, work authorities, parallel tracks, and/or locations of other trains.

12. The method of claim 10,
wherein the location attribute for the position of the train includes the trusted position and the suspect position, and wherein a determined position of the train is associated either with the trusted position or the suspect position.

13. The method of claim 10,
wherein the configuration table comprises multiple inputs, the multiple inputs relating to the plurality of input sources, and wherein each input comprises an assigned level of trust.

14. The method of claim 13,
wherein the level of trust includes multiple levels of trust, including a highest level of trust and a lowest level of trust.

15. The method of claim 13,
wherein the trusted position and the suspect position are based on different combinations of the levels of trust of the multiple inputs.

16. The method of claim 13, further comprising:
estimating an accuracy of a determined position of the train based on the levels of trust.

17. A non-transitory computer readable medium encoded with processor executable instructions that when executed by at least one processor, cause the at least one processor to carry out a method for train tracking as claimed in claim 10.

* * * * *